United States Patent
Schuberth et al.

(10) Patent No.: US 9,043,115 B2
(45) Date of Patent: May 26, 2015

(54) METHOD FOR OPERATING A LONGITUDINALLY GUIDING DRIVER ASSIST SYSTEM AND MOTOR VEHICLE

(75) Inventors: Stefan Schuberth, Ingolstadt (DE); Ralf Held, Eichstätt (DE)

(73) Assignee: AUDI AG, Ingolstadt (DE)

( * ) Notice: Subject to any disclaimer, the term of this patent is extended or adjusted under 35 U.S.C. 154(b) by 280 days.

(21) Appl. No.: 13/480,097

(22) Filed: May 24, 2012

(65) Prior Publication Data
US 2013/0138319 A1 May 30, 2013

(30) Foreign Application Priority Data
May 25, 2011 (DE) .................. 10 2011 102 435

(51) Int. Cl.
*B60K 31/00* (2006.01)
*B60W 30/14* (2006.01)
*B60W 30/18* (2012.01)

(52) U.S. Cl.
CPC .............. *B60K 31/0066* (2013.01); *B60K 31/00* (2013.01); *B60W 30/14* (2013.01); *B60W 30/146* (2013.01); *B60W 30/143* (2013.01); *B60W 30/18145* (2013.01); *B60W 2550/146* (2013.01); *B60W 2550/402* (2013.01); *B60W 2720/106* (2013.01)

(58) Field of Classification Search
CPC . B60W 30/14; B60W 30/143; B60W 30/146; B60K 31/00; B60K 31/006
USPC ........................................... 701/70, 93
See application file for complete search history.

(56) References Cited

U.S. PATENT DOCUMENTS

| | | | |
|---|---|---|---|
| 7,400,963 B2 * | 7/2008 | Lee et al. ............. | 701/93 |
| 7,774,121 B2 * | 8/2010 | Lee et al. ............. | 701/70 |
| 7,911,361 B2 * | 3/2011 | Kumabe ............... | 340/936 |
| 8,412,433 B2 | 4/2013 | Yasui et al. | |
| 2007/0150157 A1 * | 6/2007 | Lee et al. ............. | 701/93 |
| 2009/0037062 A1 * | 2/2009 | Lee et al. ............. | 701/70 |
| 2010/0198450 A1 * | 8/2010 | Shin .................... | 701/29 |

FOREIGN PATENT DOCUMENTS

| | | |
|---|---|---|
| CN | 101497336 | 8/2009 |
| DE | 102 58 167 A1 | 7/2003 |
| DE | 10 2005 027 655 A1 | 12/2006 |
| DE | 10 2006 028 277 A1 | 12/2007 |
| DE | 10 2009 015 992 A1 | 11/2009 |
| EP | 1 750 038 | 2/2007 |

* cited by examiner

*Primary Examiner* — John Q Nguyen
*Assistant Examiner* — Michael Whalen
(74) *Attorney, Agent, or Firm* — Henry M. Feiereisen LLC

(57) ABSTRACT

In a method for operating a longitudinally guiding driver assist system of a motor vehicle, wherein a comfort curve speed is determined as a function of curve data, wherein the curve data are commensurate with at least one curve to be driven through next by the motor vehicle, wherein a target speed is determined as a function of the curve comfort speed at a defined point of the curve, and wherein the speed of the motor vehicle is adjusted as a function of at least the target speed of the motor vehicle.

24 Claims, 2 Drawing Sheets

METHOD FOR OPERATING A LONGITUDINALLY GUIDING DRIVER ASSIST SYSTEM AND MOTOR VEHICLE

CROSS-REFERENCES TO RELATED APPLICATIONS

This application claims the priority of German Patent Application, Serial No. 10 2011 102 435.6, filed May 25, 2011, pursuant to 35 U.S.C. 119(a)-(d), the disclosure of which is incorporated herein by reference.

BACKGROUND OF THE INVENTION

The present invention relates to a method for operating a longitudinally guiding driver assist system of a motor vehicle.

The following discussion of related art is provided to assist the reader in understanding the advantages of the invention, and is not to be construed as an admission that this related art is prior art to this invention.

Longitudinally guiding driver assist systems are widely known in the state of the art. Such driver assist systems control the operation of the motor vehicle through automatic brake or acceleration interventions at least in part automatically. The simplest example for such a longitudinally guiding driver assist system is the so called speed control device (GRA), often also referred to as cruise control. In this case, a desired speed can be set on the driver side, which speed is then automatically maintained as accurately as possible by the driver assist system.

This concept is expanded by longitudinally guiding driver assist systems, which include a so called slave controller, and often are also referred to as ACC-systems (adaptive cruise control). Here, the speed is only adjusted to the speed desired by the driver if no vehicle driving in front was detected. For example, if a vehicle driving front is detected, in particular of course one which drives with a speed slower than the desired speed, a time gap to the vehicle driving in front is automatically maintained until the latter has disappeared and the speed can be adjusted to the desired speed again. Often, the follower mode of such an ACC-system is brought to the driver's attention by a corresponding backlit symbol.

Presently known ACC-systems can also handle curves possibly without interception by the driver when following a vehicle in front. When one approaches a curve at an excessive speed, he is normally decelerated by the vehicle driving in front, because the latter is also much too fast for the curve and has to decelerate manually. If the curve radius is very small, the ACC-control object, i.e. the vehicle driving in front, can drive out of the region of detection of the sensors and no longer be taken into account by the system, however, in most cases a sufficiently great lateral acceleration has built up in this situation, so that the curvature of the curve can be adjusted to on the basis of the lateral acceleration. This is possible, since the maximally possible speed of the motor vehicle is limited based on the lateral acceleration.

If however, the ACC-control object, i.e. the vehicle driving in front is already lost before the curve entry without an appropriate lateral acceleration having been built up, the ACC-system would accelerate before the curve, necessitating an interception by the driver. If one drives toward the curve in free drive or only with a speed control device, an interception is necessary as well.

It would therefore be desirable and advantageous to provide a method for operating a longitudinally guiding driver assist system and motor vehicle which allows driving through curves without intervention by the driver also without an automatically decelerating ACC-control object.

SUMMARY OF THE INVENTION

According to one aspect of the present invention, a method for operating a longitudinally guiding driver assist system of a motor vehicle, includes determining a comfort curve speed as a function of curve data, wherein the curve data are commensurate with a curve negotiated next by the motor vehicle, determining a target speed to be reached by the motor vehicle at a defined point of the curve as a function of the comfort curve speed, and adjusting the speed of the motor vehicle by taking the target speed into account.

The invention thus proposes to use data relating to the prospective course of the road, thus including curve data, in order to realize a speed adjustment with regard to a curve ahead, whereby no intervention by the driver in the longitudinal dynamic of the motor vehicle is required. In this way, the acceptance and the satisfaction of the user for longitudinally guiding driver assist systems, in particular speed control devices and ACC-systems, is increased. The longitudinally guiding driver assist system is thus able to automatically actively brake in response to curves, and acceleration in response to curves no longer occurs when driving in free drive or when the ACC-control object was lost. Thus, it is possible for a driver to drive on a curvy road without interceptions by braking or other interceptions in the longitudinal dynamic of the motor vehicle being necessary.

Of course, the method according to the invention is carried out fully automatically, for example within a control device of the driver assist system specifically built for this purpose.

According to another advantageous feature of the invention the curve data can be determined from road course data of a navigation device and/or from environmental data determined by at least one forward looking environmental sensor. Thus, for example, the road course stored in a navigation system is considered and analyzed with regard to curves. The actual position of the motor vehicle can for example be determined by means of a positional sensor, in particular a GPS sensor. However, it is also possible to use data from forward looking environmental sensors, in particular data of a camera or the like. Also, data of an object based environmental sensor can be considered, when for example a vehicle driving in front is detected to drive in a curve. However, it is particularly advantageous when a data fusion occurs for example by plausibility checks of a data source, for example the navigation system, by data another data source, for example a line recognition in images of a camera.

The curve data can in particular be present in a klothoid model and/or describe the curve by way of a curvature course. Klothoids have a linear curvature course so that a curve can be described by a first segment, in which the curvature of the curve increases linearly from 0 to the maximal curvature of the curve, a second segment, ultimately the curve itself, in which the curvature remains constant, and a third segment in which the curvature linearly decreases to 0 again. Since klothoids are used anyway as transition curves in curves in road construction, a description in a klothoid model is particularly appropriate. When a description of a curve in three segments as described above is used, the point at which the first segment ends and the second segment begins can advantageously be used in the open loop control, which is discussed in more detail in the following.

In an advantageous further embodiment of the present invention, the analysis of the curve data can be part of a calculation module which outputs an acceleration recommendation and at least one further calculation module, in particular a calculation module which outputs an acceleration recommendation with regard to a desired speed which is selectable on the driver side (GRA-module) and/or a calculation module which outputs an acceleration recommendation with regard to maintaining a time gap to a vehicle driving in front (slave control), wherein an acceleration request to be used for controlling the motor vehicle is determined from the acceleration recommendations by means of a prioritizing, wherein in particular the minimal acceleration request is selected. In this case, one calculation module is available for each of the different partially competing functions of the longitudinally guiding driver assist system, i.e. in an ACC system the speed control device (adjusting the speed to the desired speed), the slave controller and the braking in response to curves, wherein each of the calculation modules outputs an acceleration recommendation, which of course as recommendation of a negative acceleration can also be a deceleration recommendation. These different acceleration recommendations are then prioritized within the driver assist system, so that a maximal safety is given, wherein it is useful to always use the acceleration recommendation as acceleration request which recommends the lowest acceleration. In this way, it is possible that all functions are simultaneously active and switching between the functions is not required, which means all calculation modules cyclically output an acceleration recommendation. However, it is the finally determined acceleration request which is then used for the actual control of the engine and/or the brakes of the motor vehicle, to achieve the actual speed adjustment.

Within the context of the present invention, a comfort curve speed is determined by taking the curve data into account. Thus, a comfort curve speed is determined which would allow driving comfortably through the curve. The comfort curve speed serves as a basis for the further considerations which enable a breaking in response to the curve within the scope of the longitudinally guiding driver assist system. Concretely, the comfort curve speed can be determined from a maximal curvature of the curve and/or a curvature of the curve present at a defined point of the curve and a predefined comfort lateral acceleration. The predefined comfort acceleration can of course depend on further parameters, for example the speed. As described before, the curve can be subdivided into different segments when the curve is described in a klothoid model based on a curvature course, for example a segment of linearly increasing curvature, a segment of constant curvature and a segment of linearly decreasing curvature. Then, for example the constant curvature or the curvature at the beginning of the segment of constant curvature can be considered for determining the comfort curve speed.

According to the invention, a target speed of the motor vehicle at a defined point of the curve in particular at the first point of the curve which has the curvature which is used for determining the comfort curve speed is determined from the comfort curve speed, and taken into account when adjusting the speed. Thus, a target speed of the motor vehicle which is ideally to be reached by the driver assist system at a defined point of the curve is defined in dependence on the comfort curve speed. When the curvature course is described by way of the klothoid model, this point of the curve can for example be the transition from the first segment to the second segment. Thus, this point is regulated towards. Various embodiments are conceivable with regard to how accurately the target speed can be selected and with regard to how the concrete adjustment (or when using calculation modules the acceleration recommendation) follows from the target speed.

Thus, in a first embodiment of the present invention, the comfort curve speed can be selected as target speed, in particular when the latter is lower than an actual speed of the motor vehicle. In this case, the longitudinally guiding driver assist system takes over the deceleration of the motor vehicle, i.e. if necessary completely, so that at the relevant point of the curve, for example the transition from the first segment to the second segment, a speed of the motor vehicle is established which allows comfortably negotiating the curve. Thus, the driver does not have to intervene at all in the longitudinal guidance.

However, this is not always desired, for example when the attention of the driver is to be particularly promoted. Correspondingly, within the context of the method according to the invention it is also conceivable to select the target speed differently so that the curve can be reacted to through the longitudinally guiding driver assist system, however not necessarily to the degree that an intervention by the driver would no longer be necessary.

Thus, the comfort curve speed can be selected as target speed when the comfort curve speed is smaller than the actual speed of the motor vehicle and when the comfort curve speed deviates from the actual speed by less than a predefined threshold value, and the actual speed less the predefined threshold value is selected as target speed when the comfort curve speed deviates from the actual speed by more than the predetermined threshold value. The actual speed is used in the cyclical recalculation until the actual braking process in response to the curve begins, i.e. in particular at the beginning of a deceleration phase which is discussed in more detail below. The reference is ultimately the speed of the motor vehicle at the beginning of the adjustment measures which are actually directed toward the reduction of the speed, concretely in particular at the beginning of the deceleration phase and/or the point in time at which the calculation module which is assigned to the curve assistant outputs a deceleration as acceleration recommendation for the first time. In this way, a kind of mini-curve assistant is realized in which the speed is decreased by maximally the predetermined threshold value, for example by maximally 10 km/h. This has the advantage that the driver cannot rely on the curve assist function of the longitudinally guiding driver assist system which means that he is further accustomed to intervene in case of curves with narrow radii. This embodiment further allows for a harmonic transition to a curve controller which may be present anyway and which adjusts the speed of the motor vehicle only after a lateral acceleration has been built up based on the lateral acceleration. Of course, a calculation module can also be assigned to such a curve controller, as described above, however the curve controller can also be integrated in the calculation module (GRA-module) which is assigned to the desired speed. Finally, the additional curve assist functionality which is realized through this embodiment of the method according to the invention is "hidden" from the normal driver so that a display is not necessary, but simply allows a more harmonic driving into a curve. Similar circumstances can be achieved when for example the actual speed less a predefined percentage of the difference between the actual speed and the comfort curve speed is selected when the comfort curve speed is smaller than the actual speed of the motor vehicle, wherein for example a percentage of 10% can be used to achieve a similar effect as in the already mentioned "mini-curve assistant". Here as well, the start of the deceleration phase or the actually decelerated control in response to the curve is used as reference.

Finally, however, it is also conceivable that the comfort curve speed is selected as target speed when the comfort curve speed is smaller than the actual speed of the motor vehicle and greater than a predefined threshold value, and a predetermined threshold value is selected as target speed when the comfort curve speed is smaller than the predetermined threshold value. Such a limitation can be useful for safety reasons since in this case the entire speed which would be necessary for driving through the curve cannot be decreased, but the speed reduction is limited to a defined speed which can be significantly greater than in the "mini-curve assistant". For example, a speed of 70 km/h can be selected as predetermined threshold value.

In particular in the case when the described curve assist function of the longitudinally guiding driver assist system is realized as calculation module, as explained above, it is conceivable to define a target speed also in the case when the target speed is greater than the actual speed of the motor vehicle, in order to be always able to generate an acceleration recommendation. For example, the target speed can then generally be set to the comfort curve speed; however, other solutions are also conceivable for this case, for example an immediate output of an acceleration or the like which is maximally permissible with the driver assist system. Relevant for this case is only the determination that the speed of the vehicle only has to be decreased when the comfort curve speed is smaller than the actual speed of the motor vehicle.

In a preferred refinement of the present invention, a deceleration profile as well as a time point at the beginning of this deceleration profile is determined by taking the target speed into account and applied in a deceleration phase which begins at this time point, in order to decelerate the motor vehicle to the target speed, wherein a predefined maximally permitted deceleration is provided. The duration of the deceleration phase is thus predominantly determined by the speed to be reduced, since a fundamental, defined deceleration profile can be set, in which the deceleration is not adjusted to the speed to be reduced, but to the duration of the deceleration phase, so that the comfort can be maintained during the breaking procedure. Ultimately, the deceleration profile includes a succession of negative accelerations which decelerate the motor vehicle to the target speed. An application of the deceleration profile can of course mean on one hand a direct control of the engine, in particular also with regard to an engine break, and the brakes of the motor vehicle. However, it is also conceivable that the deceleration profile is outputted as acceleration recommendation of the corresponding calculation module when as described, calculation modules are preferably provided.

The target speed and the actual speed of the motor vehicle are known. From this follows a speed difference, which must be the integral of the deceleration profile. Of course, a certain time period is required to decelerate since a maximally permitted deceleration, which for example can be selected according to comfort criteria, is provided. Since now the time point is known at which the target speed is to be reached, namely the already mentioned marked point of the curve, the time point at the beginning of the deceleration profile can also be determined by means of the duration, which time point can of course also be the actual time point.

Of course, a cyclical recalculation takes place during the speed control, this means any adjustment measures are cyclically determined anew by taking the actual position and speed of the motor vehicle into account, in particular also the deceleration profile and the duration of the deceleration phase following from the deceleration profile, wherein as described, in case of a limitation of the speed reduction, the beginning of the deceleration phase can be used as reference for the last reference speed.

In a concrete embodiment of the present invention the deceleration can be increased linearly to the maximally permitted deceleration, in order to determine the deceleration profile, wherein at least two different slopes are provided which are separated by a plateau which is determined by the engine break. Such a linear change of the deceleration (negative acceleration) is particularly easy to construct, wherein by using different slopes, the process can reproduce the behavior of a real driver when the latter brakes in response to a curve. In this case, the deceleration profile includes a ramp in the negative acceleration region with one or more applicable limitation jolts. In this way for example an engine break can first be activated with the first slope and used for the duration of the plateau, before the brakes are actuated and a further slope is used.

Preferably, a tolerance can be taken into account at the beginning of the deceleration profile for calculating the time point. Taking such a tolerance into account is particularly useful, since the distance information (up to the marked point of the curve, at which the target speed is to be reached) can be subject to measuring errors. Thus, even though a fixed tolerance time can be predetermined, it is also possible to select the tolerance time depending on parameters for example depending on the actual speed of the motor vehicle, a determined measuring error and/or further parameters.

In a particularly advantageous embodiment of the present invention, the deceleration profile can further include an acceleration decrease phase and/or an acceleration limitation phase, in particular each being of a predetermined duration, wherein in the acceleration decrease phase a maximally possible acceleration request of the driver assist system is decreased, in particular linearly, to a in particular predefined intermediate acceleration and in the acceleration limitation phase the intermediate acceleration is constantly set, which is decreased to zero at the beginning of the deceleration phase. A maximally possible acceleration corresponds to a minimal deceleration. Further, the realization can advantageously be such that when using a calculation module "curve assistant" outside of the used phases—deceleration phase, acceleration decrease phase and/or acceleration limitation phase—the maximally permitted acceleration of the driver assist system can be set as acceleration recommendation.

Preferably, according to the invention a three phase deceleration profile is thus used, which guides the driver to the curve as comfortably as possible and finally sets the target speed. In a first phase, the possible acceleration, i.e. in particular the acceleration recommendation, is ramped down with a defined ramp from the maximally possible acceleration of the driver assist system. The second phase, the acceleration limitation phase is characterized in that no acceleration or only a small applicable acceleration may be requested. Here, it is advantageous when a small acceleration is still possible through the driver assist system, concretely the intermediate acceleration for the deceleration phase descried above. This has the advantage that the driver is well aware that the driver assist system is still active, however only in a limited manner, so that he is additionally alerted to the curve, without having to be concerned about a malfunction of the driver assist system.

Altogether, the first phase, the acceleration decrease phase, and the second phase, the acceleration limitation phase, can be selected such that they are always principally the same and have a same duration. In this case, the two phases which precede the deceleration phase always start in the identical time delay to the deceleration phase. It is also possible however, to select the properties of the acceleration decrease phase and the acceleration limitation phase in dependence on at least one operating parameter of the motor vehicle, in particular in dependence on a selected driving program. For example, when the driver has activated a sporty driving program the duration of the acceleration decrease phase and the acceleration limitation phase can be significantly limited since a dynamic reacting also of the driver assist system is desired. In particular, the acceleration limitation phase can be entirely omitted. It is also possible however, to use operating parameters, in particular a selected driving program, to change the deceleration profile, for example by using greater slopes and the like.

When the curve data describe multiple curves succeeding one another, of course an individual acceleration request or acceleration profiles can be calculated for each curve, wherein the time until reaching the curve, the duration of the acceleration decrease time and with this also the start of the other phases is different.

Further, the target speed can be displayed to the driver. In this way, the reaction of the driver assist system to the curve can be made clear to the driver. For this, the target speed can for example be displayed by means of a speedometer strip or the simple representation of the target speed in a combination display. Also, curves of different curvature can be displayed. This is particularly advantageous, because the driver can ultimately be included has a plausibility instance, since he can estimate himself whether the selected target speed is appropriate for driving through the curve. For example, errors in the target speed can also occur as a result of data and/or measuring errors, which then may result in an insufficient deceleration in response to a curve. Without a display as envisioned here, the driver would be under the impression that the driver assist system reacts in the usual way to the curve ahead, wherein however, the target speed selected for the curve is clearly too high. Displaying the target speed allows communicating to the driver how the driver assist system intends to react and the driver can decide himself whether this is sufficient.

However, it is also generally advantageous, when every time an adjustment of the speed of the vehicle occurs based on curve data, this is displayed to the driver, in particular by backlighting a symbol. In known ACC-systems every time a slave modus is active, which means when a time gap is maintained with regard to a vehicle driving in front, this is displayed to the driver for example by backlighting a symbol of a motor vehicle. Since a significant intervention by the driver assist system occurs with regard to a curve, the information regarding why the intervention occurred can also be provided to the driver. Thus for example, analogous to a symbol of a vehicle which can be backlit in the slave modus, a curve or other symbol can be backlit to indicate that adjustment in response to a curve is currently taking place. Here, a distinction may be made between a left curve and a right curve and thus for example two symbols capable of being backlit can be provided.

Beside the method, the present invention also relates to a motor vehicle, including a longitudinal guiding driver assist system with a control device, which is configured for carrying out the method according to the invention. All embodiments with regard to the method according to the invention can analogously be applied to the motor vehicle according to the invention, so that the already mentioned advantages can also be achieved with the latter.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
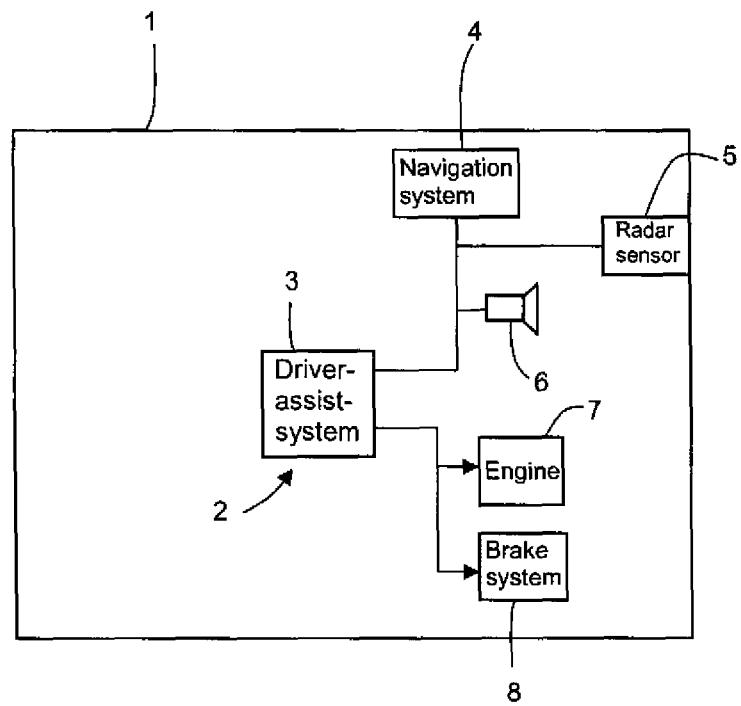
FIG. 1 shows schematic diagram of a motor vehicle according to the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a motor vehicle 1 according to the invention in a schematic diagram. It includes a longitudinally guiding driver assist system 2, here an ACC-system, which was complemented according to the invention with a curve assistant function. The operation of the driver assist system 2 is controlled by a control device 3, which is also configured for carrying out the method according to the invention. The control device 3 receives data of a navigation system 4, of a radar sensor 5 and of a camera 6, wherein the radar sensor 5 and the camera 6 are forward looking environmental sensors. From the data of these sensors curve data can be determined which describe one or more curves which the motor vehicle 1 will drive through next. These data are taken into account for the adjustment of the speed of the motor vehicle 1 by the driver assist system 2.

The output parameter of the driver assist system 2 is a defined acceleration request, which forms the basis for a corresponding control of the engine 7 and the braking system 8 of the motor vehicle 1.

Figure 2:
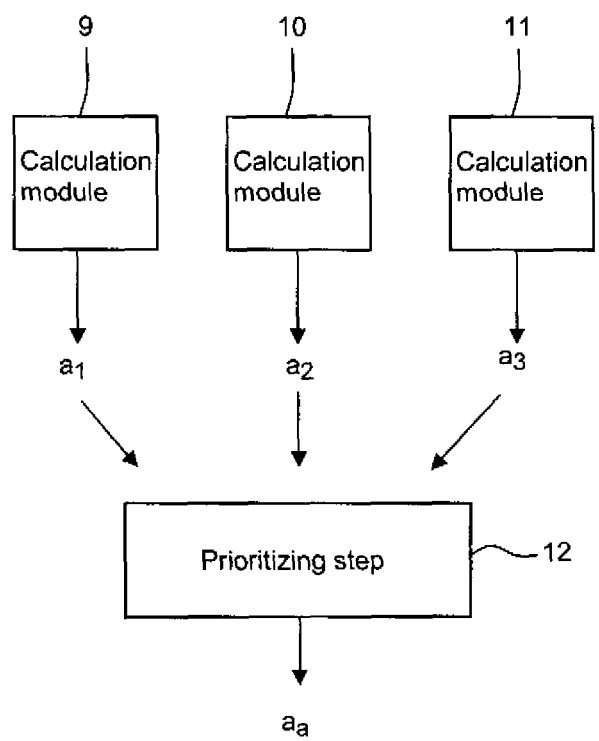
FIG. 2 shows a diagram illustrating the basic functionality of the motor vehicle according to the invention.

FIG. 2 illustrates the basic functionality of the driver assist system 2 in more detail. Calculation modules 9, 10 and 11 are assigned to each functions of the driver assist system. Each of the calculation modules 9, 10, 11 provides as output cyclically an actual acceleration recommendation $a_1$, $a_2$, $a_3$. In a prioritizing step, one of these acceleration recommendations is followed, that means an acceleration request $a_a$ is determined, which then ultimately determines the control of the engine 7 and the braking system 8.

The calculation modules 9, 10 correspond to the conventional functions of an ACC-system, wherein the calculation module 9 corresponds to the function "speed control device". The speed is adjusted to a desired speed which can be set by the driver. The calculation module 10 corresponds to the function "slave controller". When a vehicle which drives in front is detected, for example via the radar sensor 5, the speed of the motor vehicle is adjusted so that a time gap to the vehicle driving ahead is maintained which was previously set or determined by the driver. Within the context of the present invention, the calculation module 11 is additionally included, whose functionality is explained in more detail in the following. It uses the determined curve data in order to decelerate the motor vehicle 1 in response to a curve if necessary.

A single calculation module can also be provided for a function "curve controller", which controls the speed of the motor vehicle based on a lateral acceleration of the motor vehicle. In the present case, the function "curve controller" which limits the maximal speed of the motor vehicle 1 in dependence on the actual lateral acceleration, is integrated in the function "speed control device", thus it is also contained in the calculation module 9.

Since the function of the calculation modules 9 and 10 are generally known in the state of the art they are not further discussed here.

Figure 3:
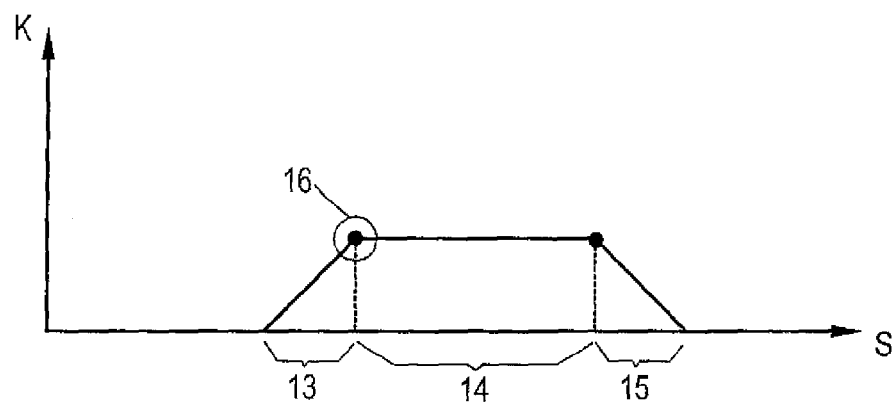
FIG. 3 shows the description of a curve as curvature course in a klothoid model.

As already explained, the basis for the function "curve assistant" are curve data which in the present case are considered as curvature course in a klothoid model, as shown exemplary in FIG. 3. In FIG. 3, the curvature K is plotted as a function of the distance S. As can be seen, a curve is characterized in a first segment 13 by a linear increase of the curvature. In a second segment 14 this maximal curvature of the curve remains constant. In a third segment 15 the curvature decreases again to 0. The maximal curvature of the curve, as it is present in the second segment 14 and the location 16 at which the first segment 13 transitions into the second segment 14, are further used in the method according to the invention on one hand to determine a target speed which on the other hand is to be reached at the location 16.

Figure 4:
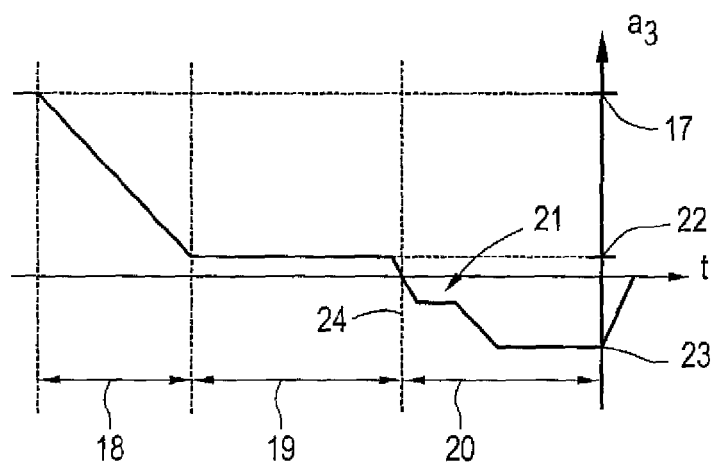
FIG. 4 shows a possible acceleration recommendation profile.

When the information relating to the distance and the curvature of an approaching curve exists, a deceleration profile can be calculated based on this information, which allows a comfortable reaction of the motor vehicle 1 to this curve. Such a deceleration profile is shown exemplary in FIG. 4 as acceleration profile (i.e. negative). There, the predicted acceleration recommendation $a_3$ is shown as a function of the time t. If a reaction to a curve is actually not required, the acceleration 17 which is maximally possible with the driver assist system 2 is generally outputted as acceleration recommendation. In order to prepare for a curve however, three phases can be distinguished namely an acceleration decrease phase 18 as first phase, an acceleration limitation phase 19 as second phase and a deceleration phase 20 as third phase.

First, however, a comfort curve speed is calculated, which allows comfortably negotiating the curve. The comfort curve speed is calculated from the maximal curvature of the curve, i.e. the curvature in the second segment of the curve, and a defined comfortable lateral acceleration. This lateral acceleration can depend on further parameters, for example on speed however, in any case it is predetermined and for example stored in the control device 3.

When the calculated comfort curve speed is greater than the actual speed of the motor vehicle 1, the curve is not reacted to, so that the acceleration 17 which is maximally possible with the driver assist system 2 is further outputted as acceleration recommendation $a_3$. However, when the comfort curve speed is smaller than the actual speed of the motor vehicle 1, this speed has to be decreased. In the present case, an exemplary embodiment is first discussed in which a target speed which is to be reached at the point 16, i.e. when the maximal curvature of the curve is also reached, is defined as the comfort curve speed. Of course, it is also conceivable to select further reference points beside point 16, for example already at the beginning of the first segment of the curve or the like.

For the speed decrease the deceleration phase 20 is defined in which a controlled deceleration behavior, i.e. a deceleration profile, is calculated. The deceleration profile is formed by a ramp 21 in the negative acceleration region, which ramp 21 has one or more applicable limitation jolts. For example, an engine brake can first be used before the actual brake is controlled as well, so that two different slopes exist in the ramp 21 which are separated by a plateau in which only the engine brake is used. The acceleration is decreased, i.e. the deceleration is increased, until starting from an acceleration/ deceleration of zero, a minimal permitted acceleration 23 which corresponds to a maximal permitted deceleration is reached. This maximal permitted deceleration is to be maintained until the target speed, here the comfort curve speed, is reached. Overall, this also determines the duration of the deceleration phase 20.

The speed to be decreased can be calculated via the time integral over the acceleration profile in the deceleration phase. Since the speed to be decreased—the difference between the actual speed of the motor vehicle 1 and the target speed—is known, the time point 24 at which the deceleration phase 20 has to begin can be calculated via the integral and the predetermined deceleration profile, since the distance to the curve and the location 16 at which the target speed is to be reached are known. Because the profile of the acceleration decrease phase 18 and the acceleration limitation phase 19 are predetermined, their starting time points correspondingly result from the time point 24. It is advantageous, when different durations and/or other properties of the acceleration decrease phase 18 and the acceleration limitation phase are present for different "driving programs". For example, in the case of a sporty driving program, shorter phases 18, 19 can be used than in a comfortable driving program and the like.

Here, however, a tolerance time is also taken into account, because the curve data, in particular the distance information, can be subject to a measuring error. In another exemplary embodiment, the actual acceleration request is also taken into account in the speed to be decreased.

In the present exemplary embodiment, the acceleration decrease phase 18 and the acceleration limitation phase 19 are to always start in an identical time interval after the deceleration phase 20. The acceleration limitation phase 19 is characterized in that only a small applicable acceleration can be requested, i.e. here that the acceleration recommendation $a_3$ is constantly maintained at the value of a still positive intermediate acceleration 22 and only linearly drops to zero at the beginning of the deceleration phase 20, in particular with the same slope with which the acceleration recommendation further decreases at the beginning of the deceleration phase 20. The acceleration decrease phase is characterized in that the acceleration recommendation $a_3$ is ramped down from the maximal possible acceleration 17 with a defined ramp.

When the forward looking environmental sensors and/or the navigation system 4 report multiple successive curves, such a profile of the acceleration recommendation $a_3$ can be calculated for each curve, wherein a different duration of the deceleration phase follows from the difference between the speed to be decrease and the target speed and with this the start of the other phases 18, 19 is also different.

The actual acceleration request of the driver assist system 2 then results as described above with reference to FIG. 2.

Figure 5:
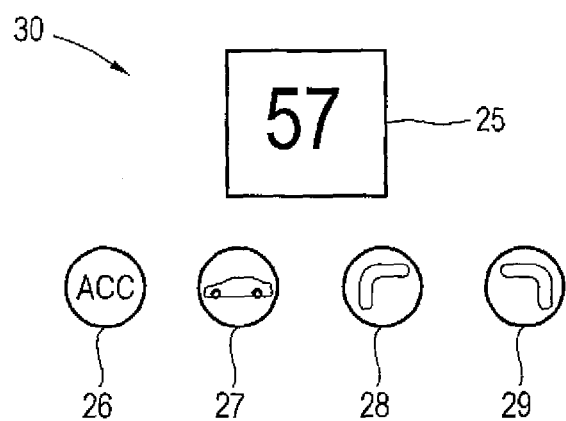
FIG. 5 shows a display device for the driver assist system.

FIG. 5 shows a display device 30, which can be used for the driver assist system 2. As can be seen, the display device 30 includes a display 25 on which the target speed can be displayed to the driver. Further, multiple symbols 26, 27, 28 and 29 which can be back-lit are provided, wherein the backlighting of the symbol 26 indicates the basic operation of the driver assist system 2. The backlighting of the symbol 27 indicates that a vehicle driving in front is detected and thus the driver assist system 2 is in the slave mode. Finally, the symbols 28 and 29 which can be backlit are provided, wherein the symbol 28 is backlit when the driver assist system 2 adjusts in response to a right curve, the symbol 29 is backlit when the driver assist system 2 adjusts in response to a left curve. A different curvature of a curve can be indicated by different symbols with corresponding curvatures of arrows. In this way, all necessary information is made known to the driver to enable the driver to understand and evaluate the behavior of the driver assist system 2.

Of course, other display means can be used as well, for example a speedometer strip for the display of the target speed and/or a display instead of the symbols 26-29.

Finally, in other embodiments, the target speed does not necessarily have to be selected as the comfort curve speed, but it is conceivable to limit the function of the driver assist system 2 for safety and/or comfort reasons.

Thus, only a maximal decrease of the speed may be permitted, for example a maximal speed reduction of 10 km/h, wherein the actual speed of the motor vehicle at the beginning of the deceleration phase 20 is used as last reference. The control is analogous to the one described with reference to FIG. 2-4 wherein however, the duration of the deceleration phase 20 is limited so that the actual speed of the motor vehicle 1 can be decreased by maximally 10 km/h as predefined threshold value at the beginning of the deceleration phase 20.

Further, it is conceivable for example, that a speed is defined as predefined threshold value for example 70 km/h and cannot be decreased by the speed reduction below this threshold value. A decrease of only a percentage of the speed is also conceivable.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating a longitudinally guiding driver assist system of a motor vehicle, comprising the steps of:
   receiving curve data with a control device;
   said curve data being commensurate with a curve negotiated next by the motor vehicle;
   determining with the control device a comfort curve speed as a function of the curve data
   determining with a calculation module a target speed to be reached by the motor vehicle at a defined point of the curve as a function of the comfort curve speed; and
   adjusting the speed of the motor vehicle by taking at least the target speed into account,
   wherein the comfort curve speed is selected as the target speed when the comfort curve speed is smaller than an actual speed of the motor vehicle by less than a predefined threshold value, and wherein the actual speed of the motor vehicle less the predefined threshold value is selected as target speed when the comfort curve speed is smaller than the actual speed by more than the predefined threshold value.

2. The method of claim 1, wherein the curve data are determined from road course data of a navigation device and/or from environmental data determined by at least one forward looking environmental sensor.

3. The method of claim 1, wherein the step of determining the comfort curve speed and the step of determining the target speed are carried out by a calculation module, said method further comprising:
   outputting a first acceleration recommendation by the calculation module as a function of the target speed;
   outputting a second acceleration recommendation by at least one other calculation module;
   prioritizing among the first acceleration recommendation and the second acceleration recommendation;
   selecting one of the first acceleration recommendation and the second acceleration recommendation as a function of said prioritizing; and
   adjusting the speed of the motor vehicle as a function of the selected acceleration recommendation.

4. The method of claim 3, wherein the second acceleration recommendation is a function of a desired speed, said desired speed being selectable at a driver-side of the motor vehicle.

5. The method of claim 3, further comprising
   outputting a third acceleration recommendation by a further calculation module as a function of a time gap to be maintained to another motor vehicle in front of the motor vehicle;
   prioritizing among the first acceleration recommendation, the second acceleration recommendation and the third acceleration recommendation;
   selecting one of the first acceleration recommendation, the second acceleration recommendation and the third acceleration recommendation as a function of said prioritizing;
   adjusting the speed of the motor vehicle as a function of the selected acceleration recommendation.

6. The method of claim 3, wherein the selected acceleration recommendation is a minimal one of the acceleration recommendations.

7. The method of claim 1, wherein the comfort curve speed is determined as a function of a maximal curvature of the curve and/or as a function of a curvature at a defined point of the curve and a predefined comfort lateral acceleration.

8. The method of claim 1, wherein the target speed is determined as a function of a curvature of the curve at a first point of the curve.

9. The method of claim 1, wherein the comfort curve speed is selected as the target speed when the comfort curve speed is lower than an actual speed of the motor vehicle.

10. The method of claim 1, wherein an actual speed of the motor vehicle less a predetermined percentage of a difference between the actual speed and the comfort curve speed is selected as the target speed when the comfort curve speed is smaller than the actual speed of the motor vehicle.

11. The method of claim 1, wherein the comfort curve speed is select as the target speed when the comfort curve speed is smaller than an actual speed of the motor vehicle and greater than a predetermined threshold value, and wherein the predetermined threshold value is selected as target speed when the comfort curve speed is smaller than the predetermined threshold value.

12. The method of claim 11, wherein, when the comfort curve speed is not selected as the target speed, the actual speed of the motor vehicle is a speed of the motor vehicle at a beginning of an actual deceleration of the motor vehicle in response to the curve.

13. The method of claim 1, further comprising
determining a deceleration profile and a time point for applying the deceleration profile, said deceleration profile defining a deceleration phase; and
initiating the deceleration phase at the time point to cause a deceleration of the motor vehicle to the target speed, said deceleration being commensurate with the deceleration profile, wherein the deceleration does not exceed a predefined maximal permitted deceleration.

14. The method of claim 13, wherein the deceleration is linearly increased to the maximal permitted deceleration, and wherein the deceleration phase is defined by at least two slopes of the deceleration profile, said at least two slopes being separated by a plateau, said plateau being a function of an operation of a motor brake of the motor vehicle.

15. The method of claim 14, wherein a tolerance time is taken into account for calculating the time point.

16. The method of claim 13, wherein the deceleration profile further defines an acceleration decrease phase and/or an acceleration limitation phase, wherein in the acceleration decrease phase a maximal possible acceleration request of the driver assist system is decreased to an intermediate acceleration, wherein the intermediate acceleration is constantly set in the acceleration limitation phase, and wherein the intermediate acceleration is set to zero at the beginning of the deceleration phase.

17. The method of claim 16, wherein the acceleration decrease phase and the acceleration limitation phase have a defined duration.

18. The method of claim 16, wherein the maximal possible acceleration request is linearly decreased to the intermediate deceleration.

19. The method of claim 16, wherein the intermediate acceleration is predefined.

20. The method of claim 16, wherein the intermediate acceleration is linearly decreased to zero at a beginning of the deceleration phase.

21. The method of claim 1, wherein the target speed is displayed to a driver of the motor vehicle.

22. The method of claim 1, wherein the target speed is displayed to a driver of the motor vehicle when the speed of the vehicle is adjusted as a function of the curve data.

23. The method of claim 22, wherein the target speed is displayed to the driver by backlighting a symbol.

24. A motor vehicle comprising:
a longitudinally guiding driver assist system, said longitudinally guiding driver assist system including a control device configured for implementing the method of claim 1.

* * * * *